United States Patent

Nakayama

(10) Patent No.: US 7,045,980 B2
(45) Date of Patent: May 16, 2006

(54) POWER CONVERTER AND VEHICLE EQUIPPED WITH POWER CONVERTER

(75) Inventor: Hiroshi Nakayama, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/537,796

(22) PCT Filed: Nov. 30, 2004

(86) PCT No.: PCT/IB2004/003920

§ 371 (c)(1),
(2), (4) Date: Jun. 7, 2005

(87) PCT Pub. No.: WO2005/057770

PCT Pub. Date: Jun. 23, 2005

(65) Prior Publication Data

US 2006/0061308 A1    Mar. 23, 2006

(30) Foreign Application Priority Data

Dec. 9, 2003    (JP)    ............... 2003-410445

(51) Int. Cl.
*H02P 1/00* (2006.01)
*H02P 3/00* (2006.01)
*H02P 5/00* (2006.01)

(52) U.S. Cl. ............ 318/139; 318/490; 363/95; 363/97; 363/98; 323/266

(58) Field of Classification Search ........ 318/139, 318/490; 323/266; 363/95, 97, 98
See application file for complete search history.

(56) References Cited

U.S. PATENT DOCUMENTS

| 4,562,390 | A | * | 12/1985 | Tobise ................. 318/490 |
| 4,716,487 | A |   | 12/1987 | Horvath et al. |
| 5,936,856 | A | * | 8/1999  | Xiang ................. 363/98 |
| 6,917,179 | B1| * | 7/2005  | Komatsu et al. ........ 318/700 |
| 2002/0121902 | A1 |   | 9/2002 | Suzuki |
| 2004/0145338 | A1 | * | 7/2004 | Nakamura et al. ...... 318/801 |
| 2005/0018457 | A1 | * | 1/2005 | Iwashita .............. 363/95 |
| 2005/0077853 | A1 | * | 4/2005 | Nagakura ............. 318/432 |
| 2005/0151658 | A1 | * | 7/2005 | Kono et al. .......... 340/647 |

FOREIGN PATENT DOCUMENTS

| EP | 1 143 594 A2 | 10/2001 |
| JP | 2001/330634 A | 11/2001 |
| JP | 2002/325302 A | 11/2002 |
| JP | 2003/134606   | 5/2003 |

* cited by examiner

*Primary Examiner*—David Martin
*Assistant Examiner*—Erick Glass
(74) *Attorney, Agent, or Firm*—Kenyon & Kenyon LLP

(57) ABSTRACT

A power source (120) supplies an input voltage (V 1). A voltage conversion circuit (130) converts the input voltage (V1) from the power source (120) into an operating voltage (V2) to be used to drive an electric load (150). A detection circuit (170) measures an insulation resistance value (R) on the output side of the voltage conversion circuit (130). A control circuit (160) controls a voltage conversion ratio (K (K=V2/V1)) in the voltage conversion circuit (130), which is expressed as a ratio of the operating voltage (V2) to the input voltage (V1), in accordance with the insulation resistance value (R) detected by the detection circuit (170). The control circuit (160) sets the voltage conversion ratio (K) such that the operating voltage (V2) becomes lower at the time of degradation of an insulation resistance than at the time of normal operation thereof.

11 Claims, 5 Drawing Sheets

POWER CONVERTER AND VEHICLE EQUIPPED WITH POWER CONVERTER

This is a 371 national phase application of PCT/IB2004/003920 filed 30 Nov. 2004, claiming priority to Japanese Application No. 2003-410445 filed 9 Dec. 2003, the contents of which are incorporated herein by reference.

BACKGROUND OF THE INVENTION

1. Field of the Invention

The invention relates to a power converter. More specifically, the invention relates to a power converter having the function of detecting an insulation resistance, and further relates to a vehicle equipped with the power converter.

2. Description of the Related Art

To ensure safety from electrification, the ISO (International Standards Organization) standard and the ECE (Economic Commission for Europe) standard require that a certain insulation resistance value be ensured for a certain voltage. Namely, in a system with an insulation resistance rate KR ($\Omega$/V) prescribed as a standard value and with an operating voltage Vs, it is necessary to ensure an insulation resistance R=KR×Vs ($\Omega$).

Accordingly, it is important, from the standpoint of safety, to precisely detect an insulation resistance during operation, and Japanese Patent Application Laid-Open No. 2002-325302 discloses an electric leakage detector that precisely detects electric leakage of a power unit that drives a motor for causing an electrically driven vehicle such as a hybrid car, an electric vehicle or the like to run.

Further, in a system composed of an electric load and a power converter (power unit) that generates a power for driving the electric load, there is also known a construction wherein the power converter has not only the function of performing power conversion between direct current and alternating current, but also the function of converting the voltage level. For instance, Japanese Patent Application Laid-Open No. 2003-134606 discloses a hybrid vehicle driving unit having a construction wherein an input voltage is boosted by a voltage-boosting converter and then converted into an alternating voltage for driving a motor unit.

However, neither Japanese Patent Application Laid-Open No. 2002-325302 nor Japanese Patent Application Laid-Open No. 2003-134606 discloses a construction wherein the operating condition of the power converter (power unit) is varied at the time of degradation of the insulation resistance. Thus, if the insulation resistance has degraded, there is no alternative but to stop operation of the converter (unit) to ensure safety or to continue to operate the converter (unit) under the same condition that does not take account of improvements in safety.

SUMMARY OF THE INVENTION

It is an object of the invention to provide a power converter that can be continuously operated by correcting an operating condition in such a manner as to ensure safety even at the time of degradation of the insulation resistance. It is also an object of the invention to provide a vehicle equipped with such a power converter.

In a first aspect of the invention, a power converter is provided with a voltage conversion circuit, a control circuit, and a detection circuit. The voltage conversion circuit receives an input voltage and converts it into an operating voltage to be used to drive an electric load. The detection circuit detects the insulation resistance on the output side of the voltage conversion circuit. The control circuit determines a set value of the operating voltage and sets the operating voltage at a time of degradation of the insulation resistance detected by the detection circuit lower than the operating voltage at a time of normal operation of the insulation resistance.

According to the above-mentioned first aspect of the invention, the insulation resistance can be detected during operation and the operating voltage can be lowered at the time of degradation of the insulation resistance. Therefore, even if the insulation resistance has degraded, operation can be continued while ensuring safety.

In particular, the operating voltage is so set as to remain below a controlled voltage that is expressed as the product of the inverse of a predetermined standard rate, which is indicated as a ratio of an insulation resistance to be ensured with respect to the operating voltage, and the detected insulation resistance. Thus, a standard value of the insulation resistance, which is prescribed in the ISO standard or the ECE standard, can be satisfied.

Further, if the voltage conversion circuit is designed to allow a boost in voltage, the operating voltage is set on the same level as a voltage input to the voltage conversion circuit without performing a voltage-boosting operation, in the case where the above-mentioned controlled voltage is lower than the input voltage. As a result, a deterioration in safety resulting from degradation of the insulation resistance is relatively counterbalanced.

In the aforementioned first aspect, the control circuit can set the operating voltage in accordance with the detected insulation resistance so that the operating voltage will not exceed a controlled voltage that is determined by the insulation resistance.

In an aspect relating to the aforementioned first aspect, the controlled voltage may be expressed as a product of an inverse of a predetermined standard rate, which is indicated as a ratio of an insulation resistance to be ensured with respect to an operating voltage, and the detected insulation resistance.

In the aforementioned first aspect, the control circuit may set the operating voltage within such a range that an upper-limit value of the operating voltage is equal to the maximum voltage that can be output by the voltage conversion circuit, if the controlled voltage is higher than the maximum voltage. The control circuit may set the operating voltage such that the operating voltage becomes equal to a minimum voltage that can be output by the voltage conversion circuit, if the controlled voltage is lower than the minimum voltage. The control circuit may set the operating voltage within such a range that the upper-limit value of the operating voltage becomes equal to the upper-limit voltage, if the controlled voltage is higher than the minimum voltage and lower than the maximum voltage.

In an aspect relating to the aforementioned first aspect, the voltage conversion circuit may be able to boost the input voltage, and the control circuit may set the operating voltage equal to the input voltage if the controlled voltage is lower than the input voltage.

In the aforementioned first aspect or an aspect relating thereto, the voltage conversion circuit may be provided with a non-insulated converter.

In the aforementioned first aspect or an aspect relating thereto, the voltage conversion circuit may be provided with an insulated converter that is constructed such that a transformer is provided between a power source and the electric load.

In a second aspect of the invention, a vehicle has a direct-current power unit that supplies an input voltage as a direct-current voltage, the power converter according to the aforementioned first aspect, and an alternating-current motor that is provided as an electric load and that can drive at least one wheel. The power converter is provided between the voltage conversion circuit and the alternating-current motor, and further includes an inverter that performs power conversion between the operating voltage and an alternating voltage for drivingly controlling the alternating-current motor.

According to the aforementioned second aspect, the vehicle makes it possible to detect an insulation resistance during operation in the power converter that drivingly controls the alternating-current motor for driving wheels, and to lower the operating voltage at the time of degradation of the insulation resistance. Hence, even if insulating properties cannot be easily ensured in the vehicle, operation can be continued while preventing a deterioration in safety from being caused by degradation of the insulation resistance, so as to satisfy the standard rate (Ω/V) of the insulation resistance which is prescribed in the ISO standard, the ECE standard or the like.

In the aforementioned second aspect, the voltage conversion circuit may be able to boost the input voltage.

In the aforementioned second aspect or an aspect relating thereto, the voltage conversion circuit may be provided with a non-insulated converter.

In the aforementioned second aspect or an aspect relating thereto, the voltage conversion circuit may be provided with an insulated converter that is constructed such that a transformer is provided between a power source and the electric load.

DETAILED DESCRIPTION OF PREFERRED EMBODIMENT

Figure 1:
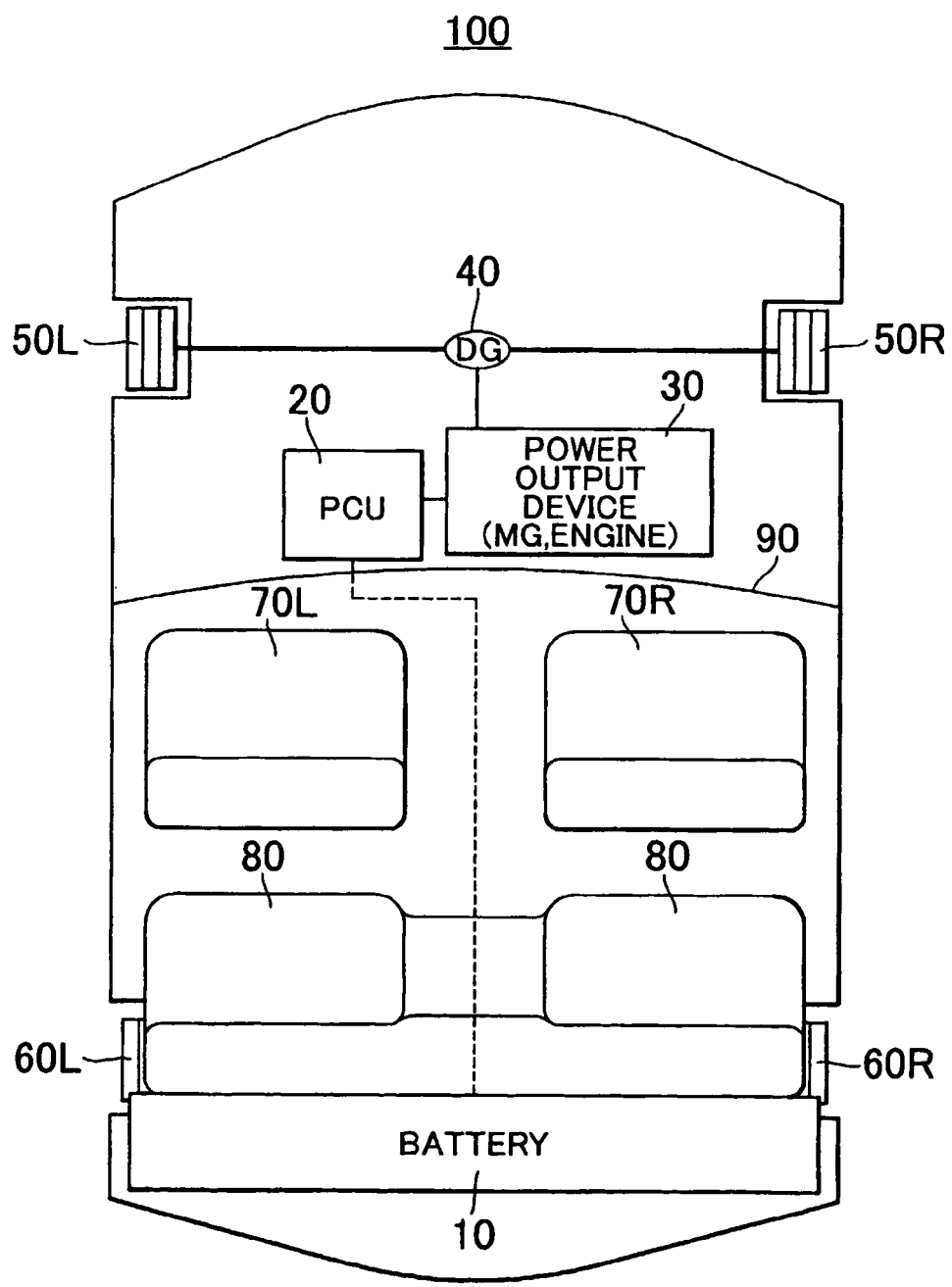
FIG. 1 is a schematic block diagram explaining the construction of a hybrid vehicle equipped with a power converter according to the invention.

Hereinafter, an embodiment of the invention will be described in detail with reference to the drawings. It is to be noted that identical or similar portions in the drawings are denoted by the same reference symbol, and that the description of those portions will not be repeated.

FIG. 1 is a schematic block diagram explaining the construction of a hybrid vehicle mounted with a power converter according to the invention.

Referring to FIG. 1, a hybrid vehicle 100 according to this embodiment of the invention is provided with a battery 10, a PCU (Power Control Unit) 20, a power output device 30, a differential gear (DG: Differential Gear) 40, front wheels 50L, 50R, rear wheels 60L, 60R, front seats 70L, 70R, and rear seats 80.

The battery 10 as "a direct-current power unit" is constructed of, for example, a secondary battery of a nickel-hydrogen type, a lithium-ion type or the like. The battery 10 supplies a direct-current voltage to the PCU 20 and is charged by a direct-current voltage from the PCU 20. The battery 10 is disposed behind the rear seats 80.

The power output device 30 is disposed in an engine room that is located in front of a dashboard 90. The PCU 20 is electrically connected to the power output device 30. The power output device 30 is coupled to the DG 40.

The PCU 20 boosts a direct-current voltage from the battery 10, converts the boosted direct-current voltage into an alternating voltage, and thus drivingly controls a motor-generator MG included in the power output device 30. Further, the PCU 20 converts an alternating voltage generated by the motor-generator MG included in the power output device 30 into a direct-current voltage, and charges the battery 10. That is, the PCU 20 corresponds to "a power converter" that performs power conversion between a direct-current power supplied by the battery 10 and an alternating power for drivingly controlling the motor-generator MG.

The power output device 30 transmits the power obtained by the engine and/or the motor-generator MG to the front wheels 50L, 50R via the DG 40, thus driving the front wheels 50L, 50R. Further, the power output device 30 generates power due to a rotational force of the motor-generator MG obtained by the front wheels 50L, 50R, and supplies the generated power to the PCU 20. Namely, the motor-generator MG plays a role of "an alternating-current motor" that can drive at least one wheel. The DG 40 transmits a power from the power output device 30 to the front wheels 50L, 50R, and transmits rotational forces of the front wheels 50L, 50R to the power output device 30.

Next, a description will be given as to the general construction of the power converter according to the invention and a concrete construction thereof in the case where the power converter is mounted in the hybrid vehicle 100 shown in FIG. 1.

Figure 2:
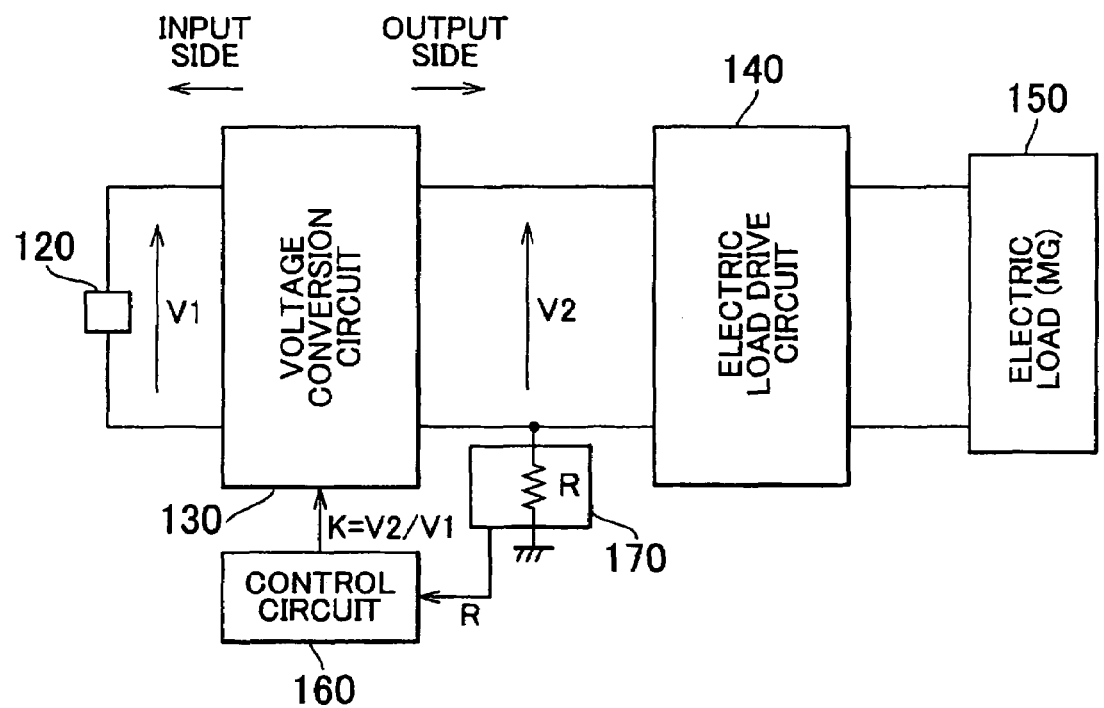
FIG. 2 is a circuit diagram showing the construction of the power converter according to the invention.

FIG. 2 is a circuit diagram showing the construction of the power converter according to the invention.

Referring to FIG. 2, the power converter 10 according to the invention is provided with a power source 120, a voltage conversion circuit 130, an electric load drive circuit 140, a control circuit 160, and a detection circuit 170. The power source 120 is disposed on an input side of the power conversion circuit 130 and supplies an input voltage V1. The voltage conversion circuit 130 converts the input voltage V1 into an operating voltage V2. The electric load drive circuit 140 is provided between the voltage conversion circuit 130 and an electric load 150.

The operating voltage V2 is used to drive the electric load 150. The electric load drive circuit 140 receives the operating voltage V2 and produces a power for driving the electric load 150. It is also possible to refrain from using the electric load drive circuit 140, and to adopt a construction in which the electric load 150 is directly driven by the operating voltage V2 output from the voltage conversion circuit 130. To take the converse point of view, the electric load drive circuit 140 needs to be disposed in the case of a construction in which the electric load 150 is driven by further subjecting to power-conversion the operating voltage V2 that has been obtained after voltage-level conversion. As described above, it is not absolutely required that the electric load drive circuit 140 be used. Depending on the type of the electric load 150, it is determined whether or not the electric load drive circuit 140 needs to be used.

The detection circuit 170 measures an insulation resistance value R on output side of the voltage conversion circuit 130. The control circuit 160 determines a set value of the operating voltage V2 by controlling the voltage conversion ratio K in the voltage conversion circuit 130 in accordance with the insulation resistance value R detected by the detection circuit 170. The voltage conversion ratio K is expressed as a ratio of the operating voltage V2 to the input voltage V1 (i.e., K=V2/V1).

In the power converter according to the invention, the method of detecting the insulation resistance, that is, the construction of the detection circuit 170 is not limited in particular, and any known technique can be adopted according to a preferred design.

Figure 3:
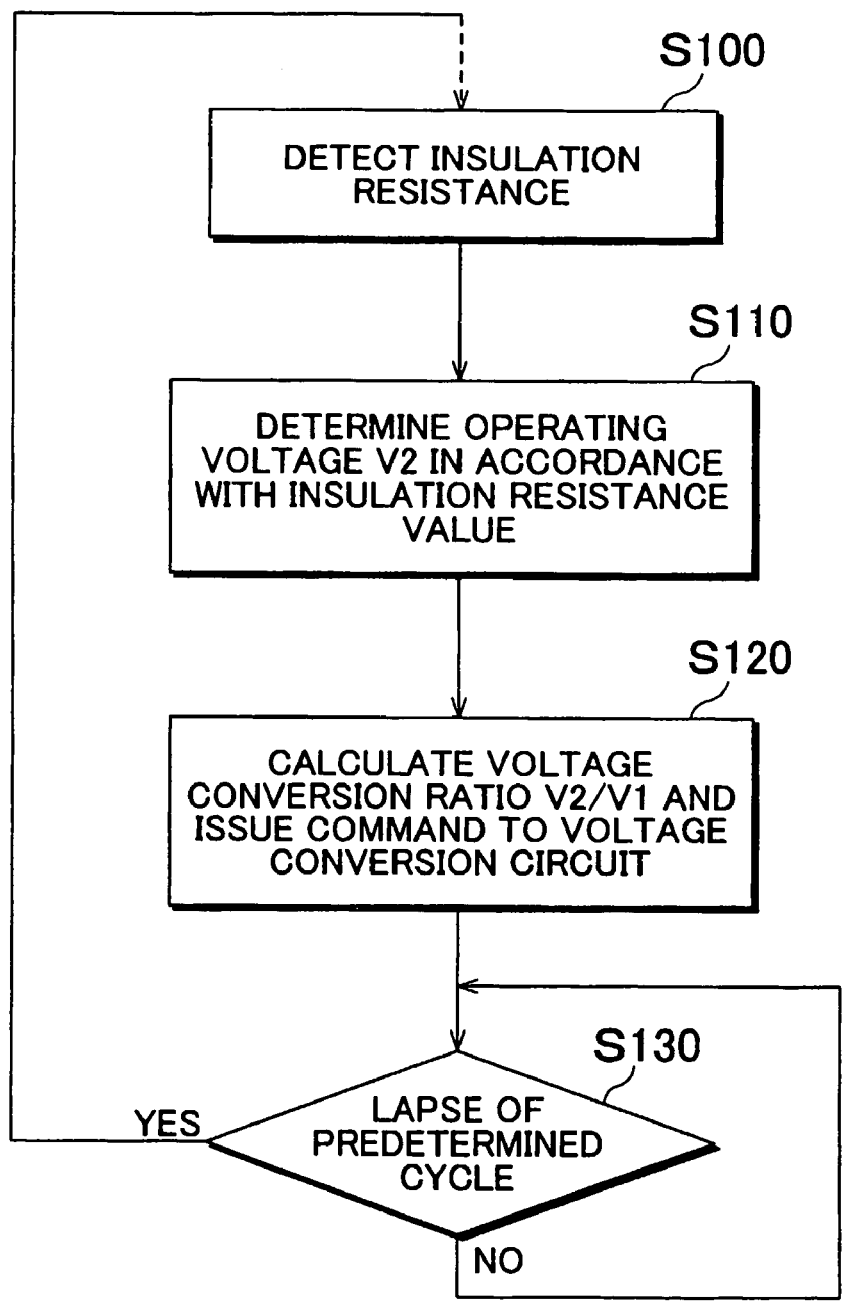
FIG. 3 is a flowchart explaining the operation of a control circuit shown in FIG. 2.

FIG. 3 is a flowchart explaining the operation of the control circuit shown in FIG. 2.

Referring to FIG. 3, the control circuit 160 detects an insulation resistance by sampling an output signal of the detection circuit 170 (step S100). In accordance with the detected insulation resistance value R, the control circuit 160 determines the operating voltage V2 as the output voltage from the voltage conversion circuit 130 by means of a technique that will be described below (step S110). Further steps 120 and 130 will be explained here below.

Figure 4:
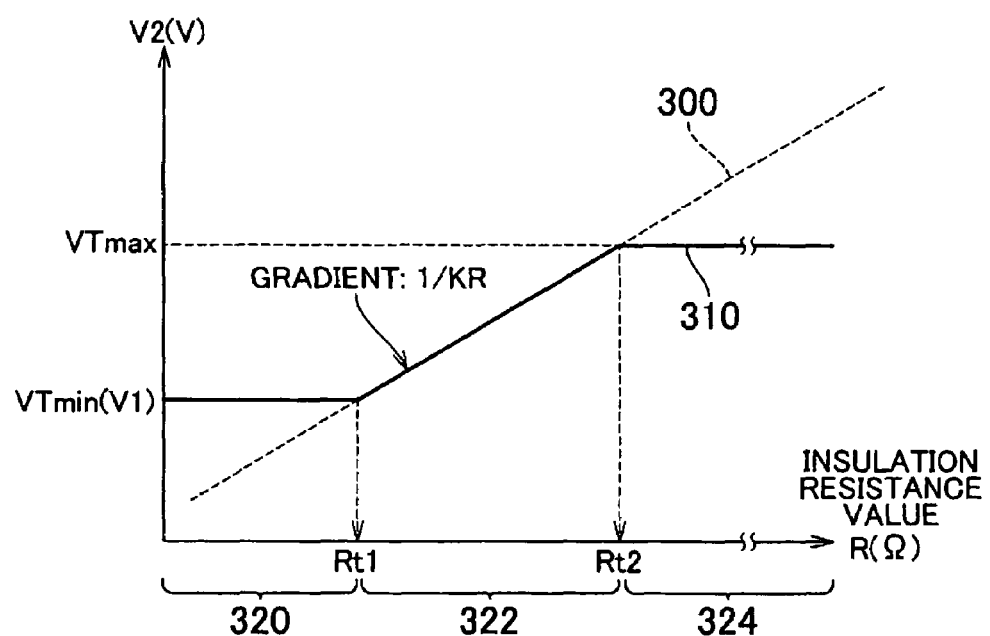
FIG. 4 is a detailed explanatory view of a technique of determining the operating voltage by the control circuit.

FIG. 4 is a detailed explanatory view of a technique of determining the operating voltage by the control circuit.

The axis of abscissa in FIG. 4 indicates the detected insulation resistance value R ($\Omega$), while the axis of ordinate in FIG. 4 indicates the set value of the operating voltage V2 (V) output from the voltage conversion circuit 130.

The above-mentioned ISO and ECE standards determine a standard rate KR ($\Omega$/V) of the insulation resistance, which is defined as a ratio of an insulation resistance to be ensured with respect to the operating voltage V2. Therefore, the control circuit 160 needs to set the operating voltage V2 such that the operating voltage V2 at least remains below "a controlled voltage", which is so determined as to allow a standard-wise necessary insulation resistance to be ensured, in accordance with the detected insulation resistance value R. As indicated by a dotted line 300 in FIG. 4, the "controlled voltage" is expressed as the product of the inverse of the aforementioned standard rate (1/KR) and the detected insulation resistance value R.

Furthermore, an upper-limit value of the operating voltage V2 is determined in consideration of a possible output range of the voltage conversion circuit 130, according to a set characteristic line 310 shown in FIG. 4.

Maximum and minimum voltages VTmax and VTmin of the operating voltage V2, which are indicated on the axis of ordinate in FIG. 4, are determined by the input voltage V1 and the possible range of the voltage conversion ratio K in the voltage conversion circuit 130. A variable range of the voltage conversion ratio K is determined in advance by a circuit structure and a circuit constant of the voltage conversion circuit 130. For example, if the voltage conversion circuit 130 is constructed such that an input voltage can be boosted (K≧1.0), the minimum voltage VTmin is equal to the input voltage V1.

In the power converter according to the invention, the possible range of the voltage conversion ratio K of the voltage conversion circuit 130 is not limited in particular. As long as a voltage-level converting function is provided, any circuit structure can be adopted.

First of all, in a region 324 where the controlled voltage (the dotted line 300) is higher than the maximum voltage VTmax of the operating voltage V2, the upper-limit value of the operating voltage V2 is set as the maximum voltage VTmax corresponding to a maximum value of the voltage conversion ratio K.

In contrast, in a region 320 where the controlled voltage (the dotted line 300) is lower than the minimum voltage VTmin of the operating voltage V2, the upper-limit value of the operating voltage V2 is set equal to the minimum voltage VTmin corresponding to the minimum value of the voltage conversion ratio K.

In this region 320, since the standard rate KR is not satisfied, operation needs to be stopped, for example, if the electric load 150 is in a certain mode. Alternatively, even in the case where the standard rate KR is not satisfied, operation may be continued on the condition that a warning message be issued to the operator, if the electric load 150 is in a mode that does not raise a safety problem. In this case, in the construction according to the invention, a deterioration in safety resulting from degradation of the insulation resistance is relatively counterbalanced by lowering the operating voltage V2 to its lower limit.

Besides, in an intermediate region 322 between the above-mentioned regions 320 and 324, the upper-limit value of the operating voltage V2 is equal to the controlled voltage (the dotted line 300). That is, the upper-limit value of the operating voltage V2 is set as a maximum value that allows the standard rate KR to be satisfied.

In the regions 322 and 324, the operating voltage V2 is determined in consideration of the efficiency of the electric load 150 as long as the upper-limit value indicated by the set characteristic line 310 is not exceeded. In general, the load efficiency can be more effectively enhanced by enhancing the operating voltage V2 and lowering the load current. Therefore, an overall reduction in power consumption is achieved by setting the operating voltage V2 as an upper-limit value corresponding to the insulation resistance value R. In the region 320, on the other hand, the operating voltage V2 is determined as the minimum voltage VTmin indicated by the set characteristic line 310.

If the insulation resistance as a boundary value between the regions 320 and 322 is denoted by Rt1 and the insulation resistance as a boundary value between the regions 322 and 324 is denoted by Rt2, it follows that Rt1=KR×VTmin and Rt2=KR×VTmax. By setting the upper-limit value of the operating voltage V2 as described above, the control circuit 160 determines that the insulation resistance has degraded, if the insulation resistance has lowered from the region 324 corresponding to a normal state where a sufficient insulation resistance is ensured, namely, if R<Rt2. Then, according to the set characteristic line 310 shown in FIG. 4, the control circuit 160 can set the operating voltage V2 lower than that in the normal state.

Referring again to FIG. 3, the control circuit 160 sets the voltage conversion ratio K from the operating voltage V2 set in step S120, and issues a control command such that the voltage conversion circuit 130 operates at the set voltage conversion ratio (step S120). When the power converter of the invention is in operation, the operations of steps S100 to S120 are performed every time a predetermined cycle elapses (step S130).

As a result, in the power converter of the invention, the insulation resistance is regularly detected during operation thereof and the operating voltage is lowered at the time of degradation of the insulation resistance, whereby operation can be continued while ensuring safety.

Especially, since the operating voltage is so set as to remain below the controlled voltage expressed as the product of an insulation resistance and a predetermined standard rate, any standard value of the insulation resistance, which is defined as a ratio of the insulation resistance value to the operating voltage, can be satisfied.

Next, a concrete construction in the case where the power converter according to the invention is applied as the PCU 20 to be mounted in the hybrid vehicle 100 shown in FIG. 1 will be described.

Figure 5:
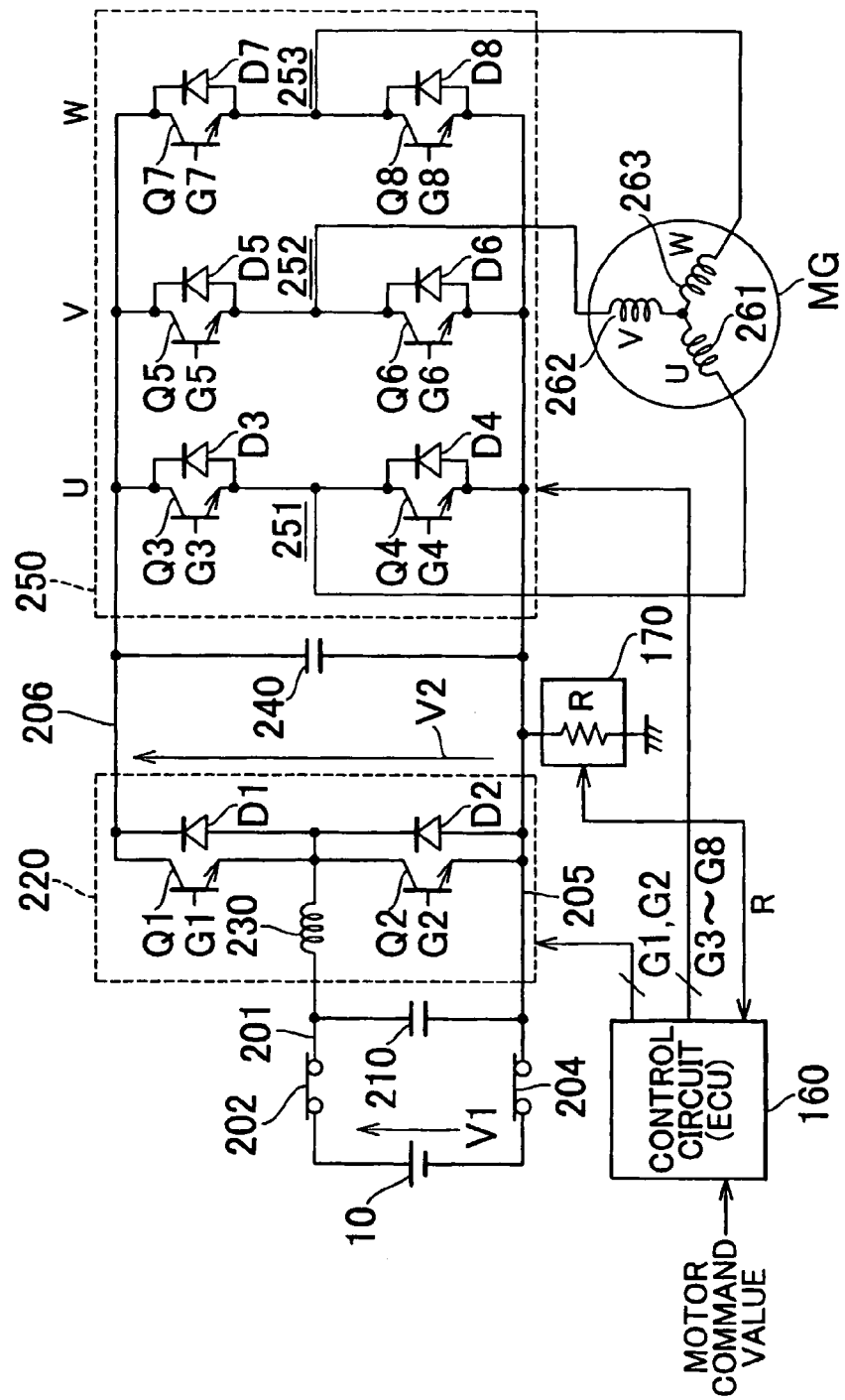
FIG. 5 is a circuit diagram explaining the construction of a PCU shown in FIG. 1 as a representative example of the power converter according to the invention.

FIG. 5 is a circuit diagram explaining the construction of the PCU shown in FIG. 1, which is a representative example of the power converter according to the invention.

Referring to FIG. 5, the PCU 20 includes the detection circuit 170, starting relays 202, 204, smoothing capacitors 210, 240, a converter 220, and an inverter 250.

As will be apparent from the following description, the battery 10 corresponds to "the power source 120" shown in FIG. 2, and the converter 220 corresponds to "the voltage conversion circuit 130" shown in FIG. 2. In particular, the converter 220 is illustrated as an example of a voltage conversion circuit allowing a boost in input voltage. By the same token, the inverter 250 corresponds to "the electric load drive circuit 140" shown in FIG. 2, and the motor-generator MG corresponds to "the electric load 150" shown in FIG. 2.

The starting relay 202 is connected between a power source line 201 and a positive pole of the battery 10, and the starting relay 204 is connected between an earth line 205 and the positive pole of the battery 10. The starting relays 202, 204 produce continuity during operation and no continuity during stoppage of operation.

The smoothing capacitor 210 is connected between the power source line 201 and the earth line 205, and smoothens the input voltage V1 from the battery 10.

The converter 220 includes a reactor 230, switching elements Q1, Q2, and diodes D1, D2. For instance, IGBT's (Insulated Gate Bipolar Transistors) are used as the switching elements of this embodiment.

The reactor 230 is connected between the power source line 201 and a connection node of the switching elements Q1, Q2. The switching elements Q1, Q2 are connected in series between the power source line 206 and the earth line 205. Inverse-parallel diodes D1, D2 are respectively connected between collectors and emitters of the respective switching elements Q1, Q2, so that current flows from the side of the emitters to the side of the collectors. In response to gate signals G1, G2 from the control circuit (ECU: Electrical Control Unit) 160, the switching elements Q1, Q2 are subjected to on-off control, namely, switching control.

The capacitor 240 is connected between the power source line 206 and the earth line 205 so as to smoothen an output voltage of the converter 220, that is, the operating voltage V2 as an input voltage of the inverter 250.

The earth line 205 is grounded by a body of the vehicle 100 (FIG. 1) via an insulation resistance. The problem regarding the insulation resistance value R on the output side of the converter 220, namely, on the high-voltage side is to ensure the above-described standard rate.

The inverter 250 is composed of a U-phase arm 251, a V-phase arm 252, and a W-phase arm 253. The U-phase arm 251, the V-phase arm 252 and the W-phase arm 253 are connected in parallel between the power source line 206 and the earth line 205. The U-phase arm 251 is composed of switching elements Q3, Q4 that are connected in series. The V-phase arm 252 is composed of switching elements Q5, Q6 that are connected in series. The W-phase arm 253 is composed of switching elements Q7, Q8 that are connected in series. Inverse-parallel diodes D3 to D8 are respectively connected between collectors and emitters of the respective switching elements Q3 to Q8. In response to gate signals G3 to G8 from the control circuit 160, the switching elements Q3 to Q8 are subjected to on-off control, namely, switching control.

Intermediate points of the respective phase arms are respectively connected to phase ends of respective phase coils 261 to 263 of the motor-generator MG as a three-phase permanent magnet motor. Each of the coils 261 to 263 is commonly connected at one end thereof to a neutral point. An alternating-current motor, which may have any number of phases (e.g., three phases) and be of any type (e.g., a permanent magnet motor), can be used as the motor-generator MG.

The converter 220 receives the input voltage V1 supplied from the battery 10 to a point between the power source line 201 and the earth line 205 and performs switching control of the switching elements Q1, Q2 responding to the gate signals G1, G2. The converter 220 thereby boosts the input voltage V1, produces the operating voltage V2, and supplies it to the capacitor 240.

A voltage-boosting ratio in the converter 220, namely, the voltage conversion ratio $K=V2/V1$ is determined in accordance with an on-period ratio (duty ratio) between the switching elements Q1, Q2. Further, when the input voltage V1 is converted into the operating voltage V2 in the converter 220, there is established a relationship $K \geq 1.0$, and the minimum voltage of the operating voltage V2 is equal to the input voltage V1.

The capacitor 240 smoothens the operating voltage V2 from the converter 220 and supplies it to the inverter 250. The inverter 250 converts the operating voltage V2 from the capacitor 240 into an alternating voltage and drives the motor-generator MG.

Further, by performing switching control of the switching elements Q3 to Q8 responding to the gate signals G3 to G8 respectively, the inverter 250 converts an alternating voltage generated by the motor-generator MG into a direct-current voltage and supplies it to the capacitor 240. The capacitor 240 smoothens a direct-current voltage from the motor-generator MG and supplies it to the converter 220. The converter 220 lowers the direct-current voltage from the capacitor 240 and supplies it to the battery 10 or a DC/DC converter (not shown) for an auxiliary power source.

The control circuit 160 generates the gate signals G3 to G8 for controlling the operation of the inverter 250 in accordance with output values from various sensors, so that a torque, a revolution and the like corresponding to a motor command value are created in the motor-generator MG. The output values from the sensors include, for example, outputs from position/speed sensors of the motor-generator, the output from a current sensor in each phase, and the output from a sensor for detecting the operating voltage V2.

The control circuit 160 determines the operating voltage V2 in accordance with the insulation resistance value R measured by the detection circuit 170 according to a control mode shown in FIGS. 3 and 4. Furthermore, the control circuit 160 generates the gate signals G1, G2 such that the voltage conversion ratio (the voltage-boosting ratio) K corresponding to the determined operating voltage V2 is realized.

Through adoption of the construction described above, in the hybrid vehicle 100, an insulation resistance is regularly detected during operation thereof and the operating voltage is lowered at the time of degradation of the insulation resistance, whereby operation can be continued while ensuring safety.

As is apparent from the foregoing, a constructional example in which the power converter according to the invention is mounted in a hybrid vehicle with an alternating-current motor for driving wheels being used as an electric load has been described in this embodiment. In particular, since insulating properties cannot be easily guaranteed in a vehicle, the standard rate (Ω/V) of an insulation resistance is strictly prescribed in the ISO standard, the ECE standard or the like. Therefore, the application of the power converter according to the invention has a great significance.

However, the application of the power converter according to the invention is not limited to the aforementioned constructional example. Namely, the invention can be applied to a power converter having functions of converting a voltage and detecting an insulation resistance, without limiting an electric load and the like in particular.

In the constructional example shown in FIG. 5, the non-insulated converter 220 is illustrated as a concrete example of a voltage conversion circuit allowing a boost in voltage. However, an insulated converter or the like which has other circuit constructions, for example, a construction in which a transformer is provided between a power source and a load may also be employed.

The embodiment disclosed herein should be construed as exemplary in all respects and not as limitative. The scope of the invention is defined not by the foregoing description but by the claims. The invention is intended to incorporate all modifications that are equivalent in significance and scope to the claims.

The invention claimed is:

1. A power converter comprising:
a voltage conversion circuit that receives an input voltage and converts the input voltage into an operating voltage to be used to drive an electric load:
a detection circuit that detects an insulation resistance on the output side of the voltage conversion circuit; and
a control circuit that determines a set value of the operating voltage and that sets the operating voltage at a time of degradation of the insulation resistance detected by the detection circuit lower than the operating voltage at a time of normal operation of the insulation resistance.

2. The power converter according to claim 1, wherein the control circuit sets the operating voltage in accordance with the detected insulation resistance so that the operating voltage remains below a controlled voltage determined by the insulation resistance.

3. The power converter according to claim 2, wherein the controlled voltage is expressed as a product of an inverse of a predetermined standard rate, which is indicated as a ratio of an insulation resistance to be ensured with respect to the operating voltage, and the detected insulation resistance.

4. The power converter according to claim 1, wherein:
the control circuit sets the operating voltage within such a range that an upper-limit value of the operating voltage is equal to a maximum voltage that can be output by the voltage conversion circuit, if the controlled voltage is higher than the maximum voltage;
the control circuit sets the operating voltage such that the operating voltage becomes equal to a minimum voltage that can be output by the voltage conversion circuit, if the controlled voltage is lower than the minimum voltage; and
the control circuit sets the operating voltage within such a range that the upper-limit value of the operating voltage becomes equal to the upper-limit voltage, if the controlled voltage is higher than the minimum voltage and lower than the maximum voltage.

5. The power converter according to claim 4, wherein:
the voltage conversion circuit can boost the input voltage; and
the control circuit sets the operating voltage equal to the input voltage if the controlled voltage is lower than the input voltage.

6. The power converter according to claim 1, wherein the voltage conversion circuit is provided with a non-insulated converter.

7. The power converter according to claim 1, wherein the voltage conversion circuit is provided with an insulated converter that is constructed such that a transformer is provided between a power source and the electric load.

8. A vehicle comprising:
a direct-current power unit that supplies the input voltage as a direct-current voltage;
a power converter which include a voltage conversion circuit that receives an input voltage and converts the input voltage into an operating voltage to be used to drive an electric load, a detection circuit that detects an insulation resistance on the output side of the voltage conversion circuit, and a control circuit that determines a set value of the operating voltage and that sets the operating voltage at a time of degradation of the insulation resistance detected by the detection circuit lower than the operating voltage at a time of normal operation of the insulation resistance; and
an alternating-current motor that is provided as the electric load and that can drive at least one wheel,
wherein the power converter is provided between the voltage conversion circuit and the alternating-current motor, and further includes an inverter that performs power conversion between the operating voltage and an alternating voltage for drivingly controlling the alternating-current motor.

9. The vehicle according to claim 8, wherein the voltage conversion circuit can boost the input voltage.

10. The vehicle according to claim 8, wherein the voltage conversion circuit is provided with a non-insulated converter.

11. The vehicle according to claim 8, wherein the voltage conversion circuit is provided with an insulated converter that is constructed such that a transformer is provided between a power source and the electric load.

* * * * *